Figure 1:
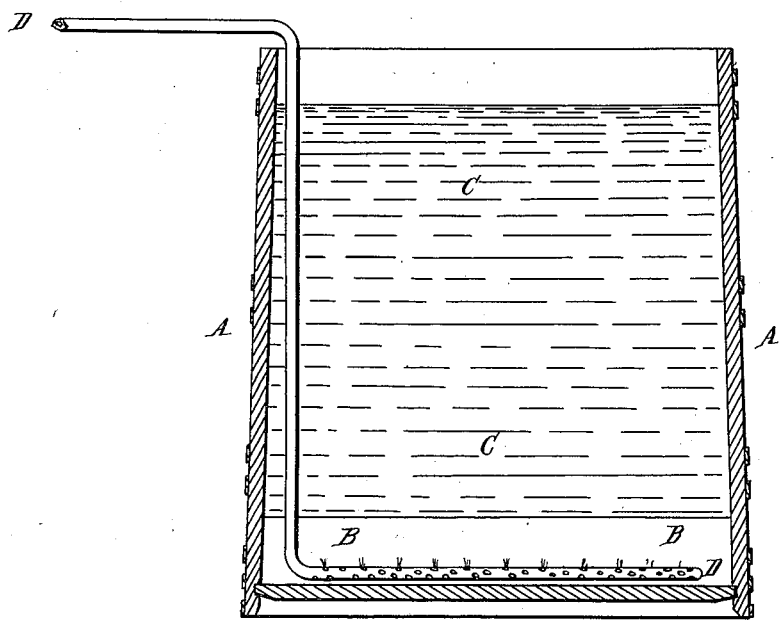

T. P. Shaffner.
Making Nitro-Glycerine.
Nº 98,425.  Patented Dec. 28, 1869.

Witnesses.  
James Dereau  
George S. Hamlin

Inventor.  
T. P. Shaffner

UNITED STATES PATENT OFFICE.

TAL. P. SHAFFNER, OF LOUISVILLE, KENTUCKY.

IMPROVEMENT IN THE MANUFACTURE OF NITRO-GLYCERINE.

Specification forming part of Letters Patent No. 98,425, dated December 28, 1869.

*To all whom it may concern:*

Be it known that I, TALIAFERRO P. SHAFFNER, of the city of Louisville, county of Jefferson, State of Kentucky, have discovered or invented a new and Improved Method of Washing Nitro-Glycerine, of which the following is a specification:

In the manufacture of nitro-glycerine there is much difficulty experienced to free it perfectly from the acids used in compounding it. The atoms of acids are frequently inclosed in the crystals of nitro-glycerine, and become disengaged when the temperature dissolves the crystals. Again, even in a warm condition the free acids are held by the heavier fluid, and they cannot rise to the top of the nitro-glycerine until carried there by a newly-generated gas or by agitation.

It will be remembered that when the nitro-glycerine is being made it assumes a specific gravity less than that of the mixed acids, and if allowed to remain quiet a few minutes it rises and settles upon the top of the acids. In practice, sometimes the acids and nitro-glycerine are drawn off separately, and on other occasions the whole of the liquids is drawn and plunged into water, calculating one gallon of the said mixture to seven or more gallons of pure water. When this proceeding is done the acids become reduced in specific gravity and the nitro-glycerine falls to the bottom of the tank. In this condition there will be found more or less acids, and it requires considerable agitation to disengage the acids from the nitro-glycerine.

With the view of purifying the said compound I have devised the mechanical parts herein described.

Figure 1 represents a tank, say five feet diameter and about the same in height.

A A is the tank. B B is nitro-glycerine. C C is acidulated or pure water. D D is a lead pipe, with perforations of the part lying on the bottom of the tank.

The parts are thus operated: I connect with the pipe cold or warm water, and by force or gravitation liberate it through the perforations at the bottom of the tank, which agitates and mingles with the nitro-glycerine, and, as each atom of water comes in contact with the atoms of acids, they unite and find a union with the water C C. I also apply air to agitate the nitro-glycerine. I fix a bellows or any known means of applying air through the pipe, and when the air is liberated or escapes through the perforations it produces an agitation, and mixes the nitro-glycerine with the water C C, and in that manner brings the remaining acids in contact with the pure water.

Having now fully described the nature of my invention or discovery sufficiently full and distinct to enable others skilled in the art to which it belongs to make and use the same, what I claim, and desire to secure by Letters Patent as my discovery or invention, is—

The combination of mechanical parts and the process of washing and agitating nitro-glycerine submerged in or mixed with water, pure or impregated with an alkali, substantially in the manner and for the purposes hereinbefore described.

TAL. P. SHAFFNER.

Witnesses:
JAMES DEVEAN,
GEORGE S. HAMLIN.